US007886535B2

United States Patent
Matsuki (10) Patent No.: US 7,886,535 B2
(45) Date of Patent: Feb. 15, 2011

(54) POSITION CONTROL METHOD FOR SHAPE MEMORY ALLOY ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 400 days.

(21) Appl. No.: 12/167,750

(22) Filed: Jul. 3, 2008

(65) Prior Publication Data

US 2009/0007561 A1    Jan. 8, 2009

(30) Foreign Application Priority Data

Jul. 6, 2007    (JP) .............................. 2007-177902

(51) Int. Cl.
  *F01B 29/10*    (2006.01)
  *F02G 1/04*    (2006.01)
(52) U.S. Cl. .......................................... 60/528; 60/527
(58) Field of Classification Search ............ 60/527–529
  See application file for complete search history.

(56) References Cited

U.S. PATENT DOCUMENTS

| | | | |
|---|---|---|---|
| 3,940,935 A * | 3/1976 | Richardson et al. ........... | 60/528 |
| 4,016,721 A * | 4/1977 | Richardson et al. ........... | 60/528 |
| 6,434,932 B2 * | 8/2002 | Hara et al. .................... | 60/527 |

FOREIGN PATENT DOCUMENTS

JP    07-274561    10/1995

* cited by examiner

*Primary Examiner*—Thomas E Denion
*Assistant Examiner*—Christopher Jetton
(74) *Attorney, Agent, or Firm*—Scully, Scott, Murphy & Presser, P.C.

(57) ABSTRACT

To provide a position control method for a shape memory alloy actuator that improves positioning accuracy of the actuator while ensuring satisfactory response until achieving positioning, the method includes a commanded resistance value setting step of setting a commanded resistance value that corresponds to the predetermined length, a resistance value measurement step of measuring the value of resistance, a resistance value comparison step of comparing the commanded resistance value and the measured resistance value, a first control step of controlling the length of the shape memory alloy using a first gain based on the result of comparison until the commanded resistance value is reached, a termination determination step of making a determination as to a condition for terminating the first control step, and a second control step of keeping the moving body stationary, upon determination of termination in the termination determination step, by retaining the length of the shape memory alloy using a second gain smaller than the first gain based on the result of the comparison, wherein the second control step is continued until a commanded resistance value is set again, thereby performing position control of the moving body.

5 Claims, 7 Drawing Sheets

POSITION CONTROL METHOD FOR SHAPE MEMORY ALLOY ACTUATOR

CROSS-REFERENCE TO RELATED APPLICATION

The present application is based upon and claims the benefit of priority from the prior Japanese Patent Application No. 2007-177902 filed on Jul. 6, 2007; the entire contents of which are incorporated herein by reference.

BACKGROUND OF THE INVENTION

1. Field of the Invention

The present invention relates to a position control method for a shape memory alloy actuator.

2. Description of the Related Art

Conventionally, actuators using a shape memory alloy are controlled by a feedback control based on the shape memory alloy's own value of resistance that changes with deformation of the shape memory alloy. For example in the case of a shape memory alloy wire, changes in the resistance of the shape memory alloy with its deformation substantially conform to changes in the wire length. In view of this, the position (or length) is indirectly controlled by a feedback control based on the value of resistance of the shape memory alloy wire.

Figure 7:
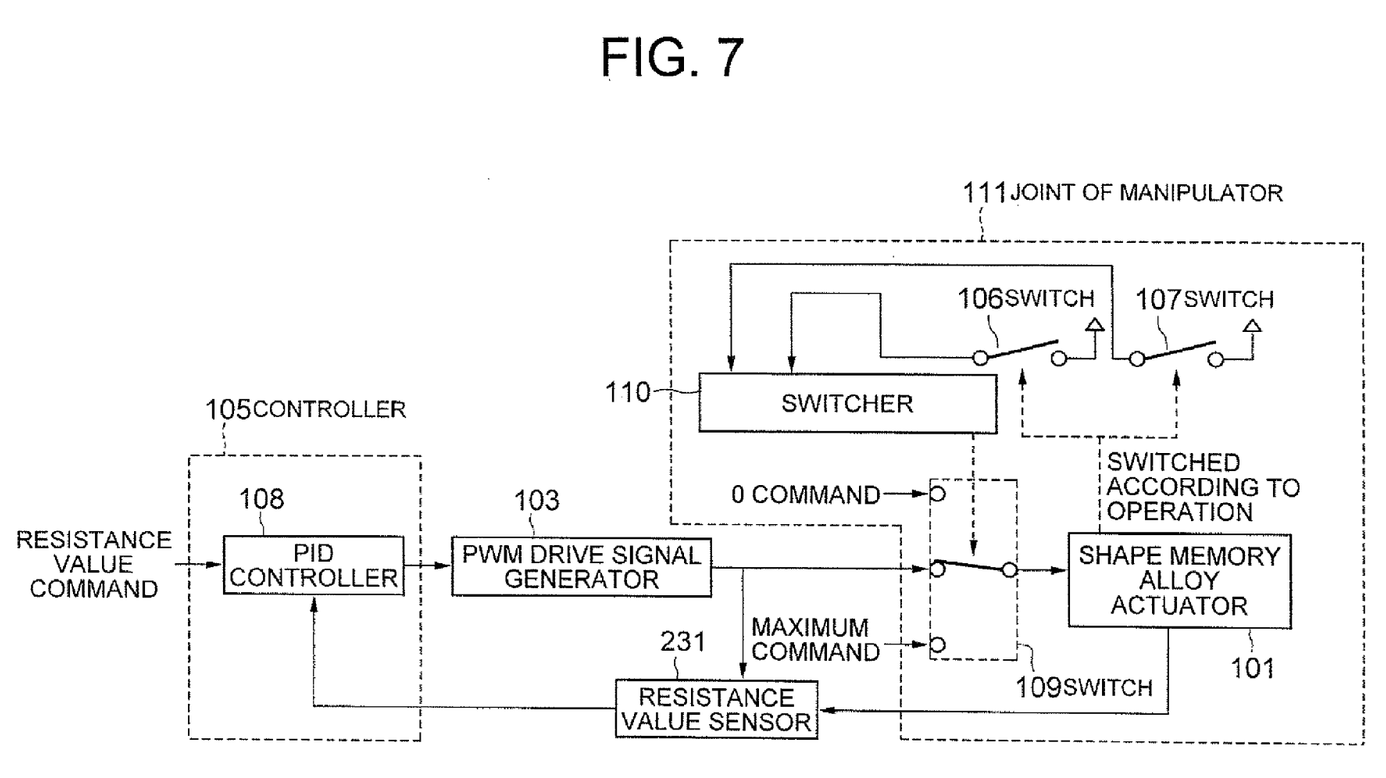
FIG. 7 is a block diagram showing a conventional configuration.

A feedback control based on the value of resistance of a shape memory alloy is disclosed, for example, in Japanese Patent Application Laid-Open No. 7-274561. FIG. 7 illustrates a conventional resistance-based feedback control system. A shape memory alloy actuator 101 is adapted to drive a load utilizing shape recovery of a shape memory alloy caused by a change in the temperature. The actuator 101 is provided with a PWM drive signal generator 103 that serves to change (or raise) the temperature of the shape memory alloy. The shape memory alloy is heated by power supplied by a PWM drive signal output from the PWM drive signal generator 103, whereby displacement of the shape memory is controlled. The PWM drive signal generator 103 receives a signal to be supplied to the shape memory alloy actuator 101 from a controller 105.

The controller 105 is provided with a PID (Proportional Integration Differential) controller 108. The PID controller 108 receives a resistance command value and the DC resistance component of the impedance of the shape memory alloy actuator 101 and outputs a signal to be supplied to the shape memory alloy actuator 101. A resistance detector 104 detects or measures the DC resistance component of the impedance of the shape memory alloy actuator 101 and outputs it to the PID controller 108 in the controller 105.

The resistance detector 104 is configured to constitute a bridge circuit in cooperation with the shape memory alloy actuator 101 so as to operate at a time when output of the PWM drive signal is off, that is, when no PWN drive signal pulse is output to the shape memory alloy actuator 101. The PID controller 108 receives a resistance command value supplied from the outside and the DC resistance component of the impedance detected by the resistance detector 104, and outputs a signal to the PWM drive signal generator 103.

The resistance command value is indicative of a commanded resistance value corresponding to the displacement amount of the shape memory alloy actuator 101. The controller 105 determines and controls the displacement of the shape memory alloy actuator 101 in accordance with the commanded resistance value input thereto.

The relationship between the temperature of a shape memory alloy that is heated by power supply and a resultant displacement thereof generally has a hysteresis. An actuator having such a hysteresis is a non-linear control objects as represented by the hysteresis. Prior art control apparatuses for an actuator have applied a linear control method such as PID feedback to such a non-linear control object. Under the present situation, there are no general methods of determining a PID gain with which satisfactory control is achieved all over the control range.

For example, in the case of a method in which control is performed with a constant gain across the board, control can be satisfactorily performed for some control target values, but oscillation may occur for some other control target values. Thus, the prior arts methods cannot improve the positioning accuracy beyond a certain limit.

SUMMARY OF THE INVENTION

The present invention has been made in view of the above described situation and has as an object to provide a position control method for a shape memory alloy actuator having a hysteresis in which two different gains are set in controlling the shape memory alloy actuator to thereby improve positioning accuracy of the actuator while ensuring satisfactory response until achieving positioning.

To solve the above described problem and achieve the object, according to the present invention there is provided a position control method for a shape memory alloy actuator that controls the length of a shape memory alloy to a predetermined length based on the value of resistance of the shape memory alloy after expansion/contraction thereof resulting from phase transformation caused by heating by power supply to thereby control the position of a moving body provided on the shape memory alloy, comprising a commanded resistance value setting step of setting a commanded resistance value that corresponds to the predetermined length, a resistance value measurement step of measuring the value of resistance after expansion/contraction of the shape memory alloy, a resistance value comparison step of comparing the commanded resistance value set in the commanded resistance value setting step and the resistance value measured in the resistance value measurement step, a first control step of controlling the length of the shape memory alloy using a first gain based on the result of comparison obtained in the resistance value comparison step until the commanded resistance value is reached, a termination determination step of making a determination as to a condition for terminating the first control step in the first control step, and a second control step of keeping the moving body stationary, upon determination of termination in the termination determination step, by retaining the length of the shape memory alloy using a second gain smaller than the first gain based on the result of the comparison, wherein the second control step is continued until a commanded resistance value is set again, thereby performing position control of the moving body.

According to a preferred mode of the present invention, it is desirable that the termination determination condition in the termination determination step be that the commanded resistance value and the detected resistance value are equal to each other in the resistance value comparison step.

According to a preferred mode of the present invention, it is desirable that the termination determination condition in the termination determination step be set in terms of a predetermined time that has elapsed after setting of the commanded resistance value.

According to a preferred mode of the present invention, it is desirable that the first and second gains be a gain used in a linear compensation and a gain used in a non-linear compensation.

According to a preferred mode of the present invention, it is desirable that the second gain be equal to zero.

DETAILED DESCRIPTION OF THE INVENTION

In the following, embodiments of the shape memory alloy actuator according to the present invention will be described in detail with reference to the accompanying drawings. It should be understood that the present invention is not limited by the embodiments.

First Embodiment

Figure 1:
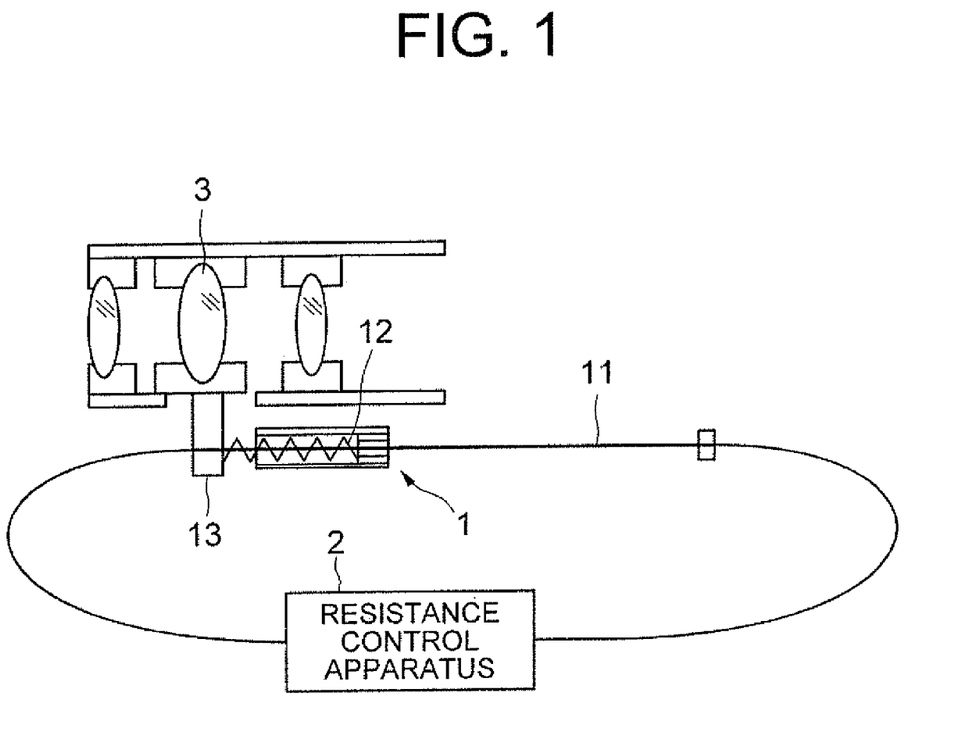
FIG. 1 is a diagram showing the configuration relating to control of a shape memory alloy actuator according to a first embodiment of the present invention.

A first embodiment of the present invention will be described with reference to FIGS. 1 through 5. FIG. 1 is a diagram schematically showing an exemplary configuration related to control of a shape memory alloy actuator 1 according to this embodiment.

A shape memory alloy actuator 1 includes a shape memory alloy wire 11 that contracts when heated by power supply, a bias spring 12 that exerts a force counteracting contraction of the shape memory alloy wire 11, a moving body 13 that moves with expansion and contraction of the shape memory alloy wire 11, and a resistance control apparatus 2.

The resistance control apparatus 2 heats the shape memory alloy wire 11 by power supply. In addition, the resistance control apparatus 2 measures the value of resistance of the shape memory alloy wire 11 after expansion/contraction thereof, and controls the length of the shape memory alloy wire 11 by a feedback based on the value of resistance. As shown in FIG. 1, the shape memory alloy actuator 1 according to this embodiment is configured to control the position of a lens 3 attached on the moving body by controlling the length of the shape memory alloy wire 11.

Figure 2:
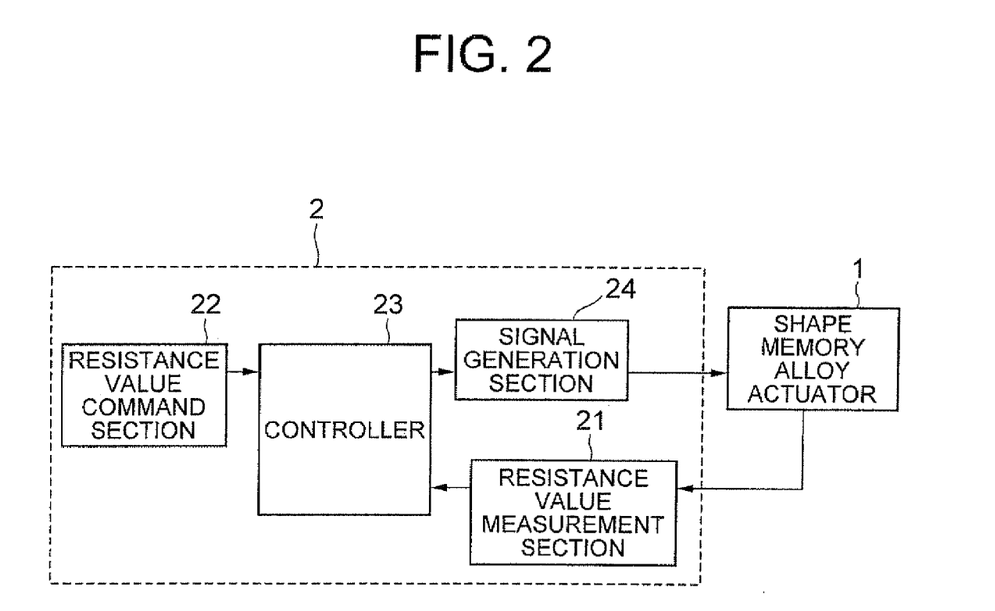
FIG. 2 is a block diagram showing the configuration of a resistance control apparatus according to the first embodiment.

FIG. 2 illustrates the configuration of the resistance control apparatus 2. The resistance control apparatus 2 includes a resistance value measurement section 21 that measures the value of resistance of the shape memory alloy actuator 1, a resistance value command section 22 that sets a commanded resistance value for adjusting the length of the shape memory alloy wire 11 to a predetermined length, a controller 23 that calculates the amount of power to be supplied to the shape memory alloy wire 11 based on a comparison of the value of resistance obtained from the resistance measurement section 21 and the commanded resistance value set by the resistance value command section 22, and a signal generation section 24 that outputs the calculated amount of power to the shape memory alloy wire 11.

Figure 3:
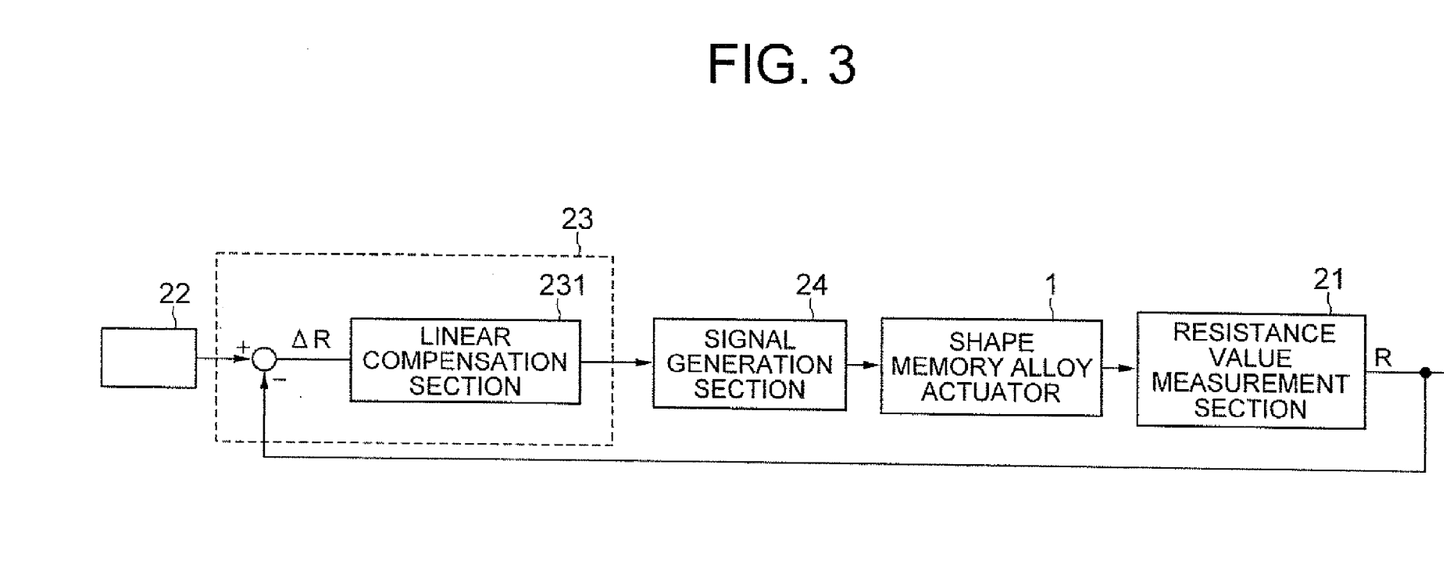
FIG. 3 is a control block diagram of the shape memory alloy actuator according to the first embodiment.

FIG. 3 is a control block diagram of the shape memory alloy actuator 1. Here, a control algorithm executed in the controller 23 will be described. A comparison of the value of resistance obtained by the resistance value measurement section 21 and the commanded resistance value is performed based, for example, on their difference ($\Delta R$). The result of the comparison is processed by calculation in the linear compensation section 231 in the controller 23. In the linear compensation section 231, proportional, integral and derivative calculations are performed on the comparison result in a manner similar to the PID control, and the result of the calculations is output to the signal generation section 24.

Figure 4:
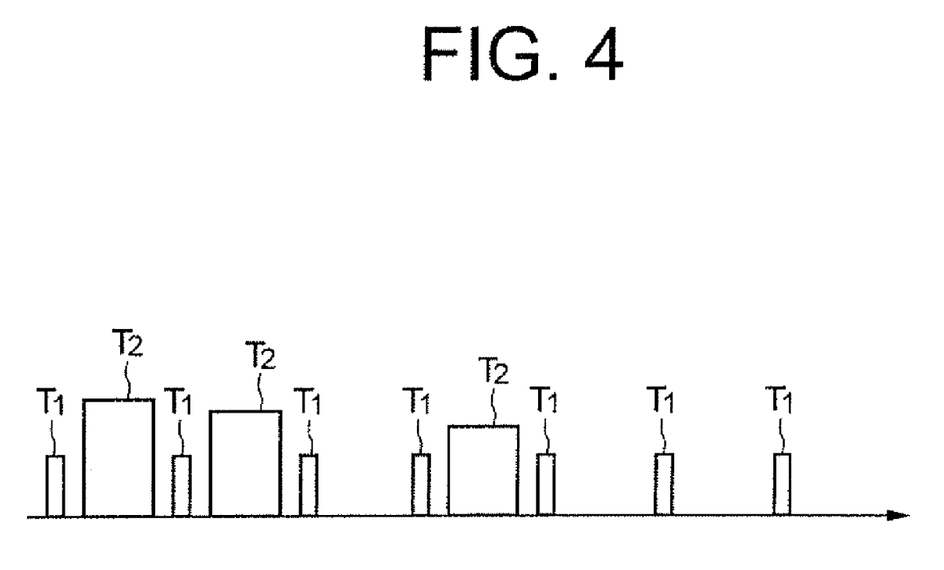
FIG. 4 is a chart illustrating timing of drive signals and resistance measurement according to the first embodiment.

FIG. 4 is a chart showing timing of driving and resistance measurement. At times T1, the measured value of resistance (actual resistance value) output from the resistance value measurement section 21 is read. At times T2, the drive signal output from the signal generation section 24 is applied on the shape memory alloy actuator 1.

As will be seen from FIG. 4, measurement of the value of resistance is not performed while the shape memory alloy actuator 1 is being deformed. Measurement of the value of resistance is performed repeatedly at times T1 before and after application of the drive signal.

The level of the drive signal is changed by making a linear compensation on the basic value of resistance that has been read.

In FIG. 4, changes in the height of the bars at times T2 represent changes in the drive signal level. For example, after the measured resistance value (actual resistance value) has been read, if the commanded resistance value is smaller than the actual resistance value, a drive voltage is applied to the shape memory alloy actuator 1. In connection with this, the level of the drive signal is changed based on the difference between the actual resistance value and the commanded resistance value. If the commanded resistance valued is equal to or larger than the actual resistance value, the drive voltage is turned off.

Figure 5:
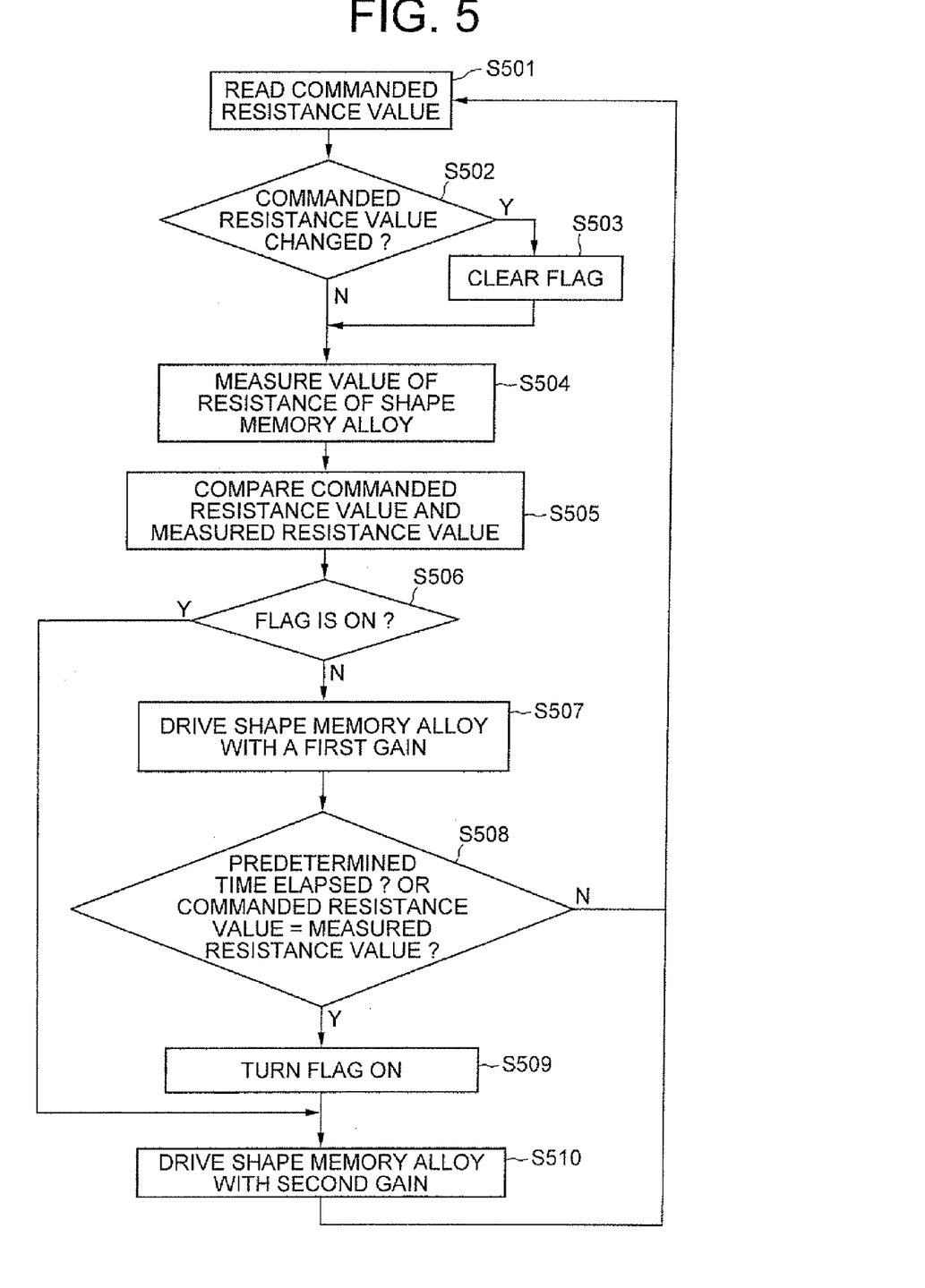
FIG. 5 is a flow chart of a process of position control according to the first embodiment.

FIG. 5 is a flow chart of a process of position control in the shape memory alloy actuator 1 according to the present invention. First, a commanded resistance value corresponding to a length of displacement of the shape memory alloy actuator 1 is set. After the start of the control, the controller 23 reads, in step S501, the commanded resistance value from the resistance value command section 22.

In step S502, a determination is made as to whether the commanded value has been changed or not. If the determination in step S502 is affirmative (YES), the process proceeds to step S503. In step S503, a flag is cleared, and the process proceeds to step S504. On the other hand, if the determination in step S502 is negative (NO), the process proceeds to step 3504.

In step S504, the value of resistance of the shape memory alloy actuator 1 is measured by the resistance measurement section 21. In step S505, a comparison of the commanded resistance value and the measured resistance value (or actual resistance value) is performed. Here, the difference between the commanded resistance value and the measured resistance value is calculated.

In step S506, a determination is made as to whether the flag is on or not. If the determination in step S506 is affirmative, the process proceeds to step S510. If the determination in step S506 is negative, the process proceeds to step S507.

In step S507, the level of a drive signal to be applied to the shape memory alloy actuator 1 is calculated using a first gain, and the drive signal is applied to the shape memory alloy actuator to deform it. The first gain is set to be larger than a second gain.

In step S508, a determination is made as to whether a predetermined time has elapsed since the time at which the commanded resistance value was set and the control was started, or whether the measured resistance value has reached the commanded resistance value. If the determination in step S508 as affirmative, the process proceeds to step S509. If the determination in step S508 is negative, the process returns to step S501.

In step S509, the flag is turned on, and the process proceeds to step S510. In step S510, the shape memory alloy is driven with the second gain, and the process returns to step S501. Then, the process of step S501 and subsequent steps is performed again in the same manner.

According to the above described control process, the resistance value control using the first gain is performed until the predetermined time has elapsed since the start of the control at which the commanded resistance value was set or until the measured resistance value reaches the commanded resistance value. The comparison of the two resistance values is performed by, for example, calculating the difference between the measured resistance value and the commanded resistance value.

As described above, the first gain is set to be larger than the second gain so as to make the displacement amount larger. This makes the response speed higher until the commanded resistance value is reached. The first gain is selected while placing importance on the response speed of the shape memory alloy actuator 1. When the first gain is used, although the response speed is high, position controllability at the time when the commanded resistance value is reached is relatively low.

In this embodiment, after the predetermined time has elapsed or the commanded resistance value is reached, the second gain that has been set differently from the first gain is used in place of the first gain in controlling the shape memory alloy actuator 1.

The second gain is set to be smaller than the first gain to make the displacement amount smaller. This leads to a decrease in the response speed, but oscillation can be prevented from occurring. When the second gain is used, stability of position control at the time when the commanded resistance value is reached is high, though the response speed is relatively low.

The second gain is set in such a way as to allow the actuator to respond to changes in the environment etc. In other words, it is sufficient that the response speed associated with the second gain is large enough to enable the actuator to respond to changes in the displacement amount of the shape memory alloy caused by changes in the ambient temperature. As per the above, the use of the first gain enables the response time or the time taken until the commanded resistance value is reached to be shortened. On the other hand, the use of the second gain enables the resistance to be kept stably at the commanded resistance value or enables the shape memory alloy actuator to stably keep the position at the target length. Thus, by setting two different gains, positioning accuracy of the actuator can be enhanced while achieving a satisfactory response speed until the positioning is achieved.

The control using the second gain is to be performed until the commanded resistance value is changed. When the commanded resistance value changes, the control using the first gain is restarted. In the flow chart of the process in this embodiment, a determination as to whether the control is to be performed using the first gain or the second gain is made based on the status of a flag. The condition for turning on the flag is, for example, that the measured resistance value reaches the commanded resistance value, or that a predetermined time has elapsed since the start of the control at which the commanded resistance value was set or changed.

Second Embodiment

Figure 6:
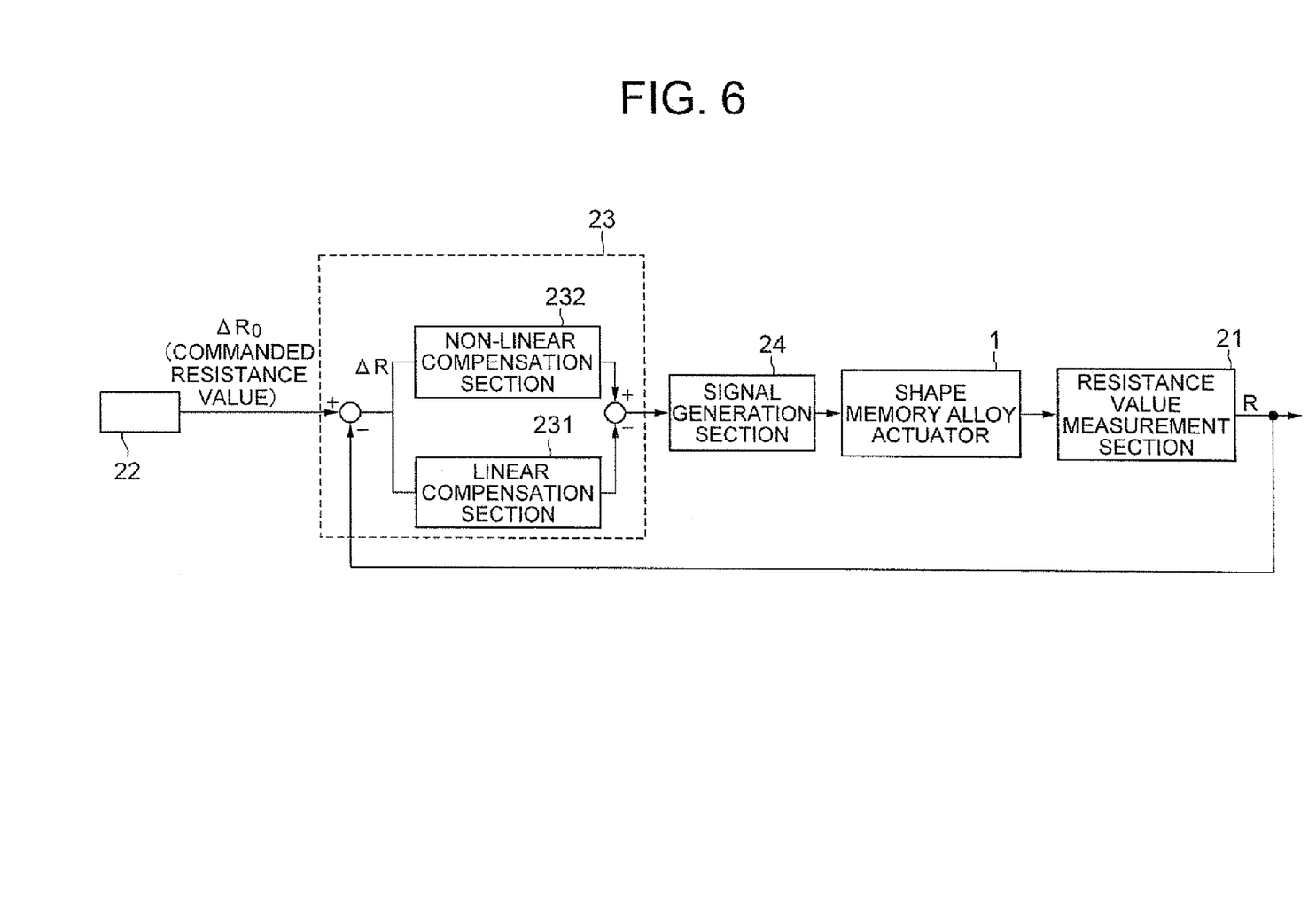
FIG. 6 is a block diagram showing the configuration a controller according to a second embodiment.

FIG. 6 is a block diagram illustrating the configuration of a controller used in a method of controlling a shape memory alloy actuator according to a second embodiment of the present invention. The sections same as those in the first embodiment will be denoted by the same reference signs to omit redundant description.

As shown in FIG. 6, in the second embodiment, a linear compensation section 231 and a non-linear compensation section 232 are provided in the controller 23 to perform calculation.

In the non-linear compensation section 232, the hysteresis (or non-linear characteristics) of the shape memory alloy actuator 1 is approximated by, for example, the following formula (1):

$$C_0 + \sum_{k=1}^{n} C_1 (X - X_0)^{2k-1}$$

where X is the output of the resistance value command section 22, $X_0$ is the output of the resistance value measurement section 21, and $C_0$ and $C_k$ are predetermined constants, e.g. non-linear gains.

In this correction method, in the region in which the gradient of deformation of the heated shape memory alloy relative to its temperature is small, the commanded resistance value is reached in a short time thanks to a high gain, while in the region where the gradient is large, the gain is lowered to achieve stability. By introducing a non-linear compensation into the calculation in the controller 23 in this way, the response and the position controllability of the shape memory alloy actuator 1 can be further improved. In the case of the non-linear gain also, first and second gains are used as with the case of the linear gain.

The second gain may be set to any value smaller than the first value. If the operation environment is stable, the second gain may be set equal to zero. In this case, a constant drive signal is always supplied to the shape memory alloy actuator 1, and the actuator is kept stationary at a position.

As per the above, the position control method for a shape memory alloy actuator according to the present invention can be advantageously applied to shape memory alloy actuators that have a hysteresis. In particular, the method of the present invention is suitable for use in position control of shape memory alloy actuators that are required to have high response speed and high positioning accuracy.

The position control method for a shape memory alloy actuator according to the present invention advantageously improves the positioning accuracy of the actuator while ensuring satisfactory response until achieving positioning by setting two difference gains in controlling a shape memory alloy actuator having a hysteresis.

What is claimed is:

1. A position control method for a shape memory alloy actuator that controls the length of a shape memory alloy to a predetermined length based on the value of resistance of the shape memory alloy with expansion/contraction thereof resulting from phase transformation caused by heating by power supply to thereby control the position of a moving body provided on the shape memory alloy, comprising:
- a commanded resistance value setting step of setting a commanded resistance value that corresponds to the predetermined length;
- a resistance value measurement step of measuring the value of resistance with expansion/contraction of the shape memory alloy;
- a resistance value comparison step of comparing the commanded resistance value set in the commanded resistance value setting step and the resistance value measured in the resistance value measurement step;
- a first control step of controlling the length of the shape memory alloy using a first gain based on the result of comparison obtained in the resistance value comparison step until the commanded resistance value is reached;
- a termination determination step of making a determination as to a condition for terminating the first control step in the first control step; and
- a second control step of keeping the moving body stationary, upon determination of termination in the termination determination step, by retaining the length of the shape memory alloy using a second gain smaller than the first gain based on the result of the comparison, wherein the second control step is continued until a commanded resistance value is set again, thereby performing position control of the moving body.

2. A position control method for a shape memory alloy actuator according to claim 1, wherein the termination determination condition in the termination determination step is that the commanded resistance value and the detected resistance value are equal to each other in the resistance value comparison step.

3. A position control method for a shape memory alloy actuator according to claim 1, wherein the termination determination condition in the termination determination step is set in terms of a predetermined time that has elapsed after setting of the commanded resistance value.

4. A position control method for a shape memory alloy actuator according to claim 1, wherein the first and second gains are a gain used in a linear compensation and a gain used in a non-linear compensation.

5. A position control method for a shape memory alloy actuator according to claim 1, wherein the second gain is equal to zero.

* * * * *